US009874261B2

United States Patent
Lu (10) Patent No.: US 9,874,261 B2
(45) Date of Patent: Jan. 23, 2018

(54) ANTI-IMPACT FORCE APPARATUS (71) Applicants: Kuoching Lu, Guishan Town Taoyuan County, Taiwan (CN); Kuyuan Lu, Guishan Town, Taoyuan County, Taiwan (CN)

(72) Inventor: Kuoching Lu, Guishan Town (CN)

(73) Assignee: Kuyuan Lu, Taiwan (CN)

( * ) Notice: Subject to any disclaimer, the term of this patent is extended or adjusted under 35 U.S.C. 154(b) by 0 days.

(21) Appl. No.: 14/650,613

(22) PCT Filed: Dec. 10, 2012

(86) PCT No.: PCT/CN2012/001670
§ 371 (c)(1),
(2) Date: Jun. 9, 2015

(87) PCT Pub. No.: WO2014/089720
PCT Pub. Date: Jun. 19, 2014

(65) Prior Publication Data
US 2015/0316116 A1  Nov. 5, 2015

(51) Int. Cl.
*F16F 15/28* (2006.01)
*F16F 7/10* (2006.01)
(Continued)

(52) U.S. Cl.
CPC .............. *F16F 7/1022* (2013.01); *F03G 7/08* (2013.01); *F16F 13/005* (2013.01); *F16H 21/16* (2013.01); *F16H 35/10* (2013.01); *F16F 2232/06* (2013.01)

(58) Field of Classification Search
CPC ..... Y10T 74/2184; F16F 13/07; F16F 13/264; F16F 15/283; F16F 15/28; F16F 15/14;
(Continued)

(56) References Cited

U.S. PATENT DOCUMENTS 1,916,085 A * 6/1933 Manning ............... F16F 15/283
74/570.1
4,014,392 A * 3/1977 Ross .................... B25D 11/125
173/117
(Continued)

FOREIGN PATENT DOCUMENTS

CN      1104782       7/1997
CN    101592207    12/2009
(Continued)

OTHER PUBLICATIONS

International Search Report filed in PCT/CN2012/001670 dated Sep. 19, 2013.

*Primary Examiner* — Bradley T King
*Assistant Examiner* — Stephen M Bowes
(74) *Attorney, Agent, or Firm* — Rankin, Hill & Clark LLP (57) ABSTRACT

Disclosed is an anti-impact force apparatus, including an object capable of performing a circular motion, a connecting rod, push rods, a protective plate, a spring, a bearing, a push rod bracket and a base. When the protective plate is subjected to impact, the plurality of groups of push rods can move simultaneously to firstly buffer an introduced linear impact force via extrusion of the spring, then the connecting rod pushes the object capable of performing a circular motion to rotate to convert the linear impact force into a circular motion force, instantly converting the impact force into an anti-impact force, and the push rods are pulled back to an original impact point to push away an impactor, offsetting or weakening damage caused by the impact force.

1 Claim, 6 Drawing Sheets (51) Int. Cl.
  *F16F 13/00* (2006.01)
  *F16H 21/16* (2006.01)
  *F16H 35/10* (2006.01)
  *F03G 7/08* (2006.01)

(58) Field of Classification Search
  CPC ...... F16F 15/264; F16F 15/022; F16F 15/043;
  F16F 15/1205
  See application file for complete search history.

(56) References Cited

U.S. PATENT DOCUMENTS

| | | | | |
|---|---|---|---|---|
| 4,318,535 A * | 3/1982 | Imai | ..................... | B60G 15/061 |
| | | | | 188/282.6 |
| 6,029,541 A * | 2/2000 | Schrick | ..................... | F16F 7/10 |
| | | | | 74/595 |
| 7,331,407 B2 * | 2/2008 | Stirm | ................... | B25D 11/062 |
| | | | | 173/162.1 |

FOREIGN PATENT DOCUMENTS

| | | | | |
|---|---|---|---|---|
| CN | 103161902 | 6/2013 | | |
| FR | 2558528 | 7/1985 | | |
| GB | 2008184 A * | 5/1979 | .............. | E05F 3/104 |

* cited by examiner

ANTI-IMPACT FORCE APPARATUS

TECHNICAL FIELD

The present invention relates to a technology of generating an anti-impact force, in particular to an anti-impact force apparatus, transforming and guiding an impact force of a linear movement of an object into a circular motion, and then transforming it into an anti-impact force, and thus offsetting or weakening a destruction caused by the impact force to the object.

BACKGROUND ART

Generally, an apparatus for protecting an object against an impact force, are mostly selected from a rubber, a spring, a hydraulic device and other cushioning devices. However, as long as the object is impacted by a large impact force, the protected object is still unable to avoid a serious damage; because when the quality and the speed of the impactor is much better than that of the cushioning device, the general cushioning means would completely lose the effect of counterbalancing the impact force.

SUMMARY OF THE INVENTION

In order to overcome the technical problem of the existing cushioning device such as they can not effectively protect the safety of high-speed moving objects such as vehicles, the present invention provides an anti-impact force apparatus, when the object encounters a collision, it can transform and conveniently guide an impact force of an original linear movement of an object into a circular motion, and then instantly transform it into an anti-impact force which is equal to the impact force, and thus offset or weaken a damage caused by the impact force to the object.

To achieve the above technical object, the technical solution of the present invention is:

An anti-impact force apparatus, formed by objects that can do a circular motion, such as a crankshaft or a wheel, a connecting rod, a pushing rod, a fender plate, a spring, a bearing, a pushing rod, a bracket for the pushing rod, and a base; Wherein: the objects that can do a circular motion such as a crankshaft or a wheel, are mounted on the bearing so as to be fixed to the base, so that they can rotate freely;

if the crankshaft has multiple connecting rod journals, then at the same time is provided with a plurality of connecting rods, one end of each connecting rod is connected to a connecting rod journal of the crankshaft, and the other end of the each connecting rod is connected to a pushing rod, each of the pushing rods is fixed to a predetermined position by more than two brackets for the pushing rods respectively, and can stretch out and draw back freely back and forth, and a compressible spring is provided in each pushing rod, the pushing rods in the same direction can either share a fender plate, or each of the pushing rods is independently provided with one fender plate;

If a single-shaft two-wheel way is adopted, then a single connecting rod shaft is provided in two wheels, and is connected with two groups of connecting rods and pushing rods, each of the pushing rods is fixed to a predetermined position by more than two brackets for the pushing rods respectively, and can stretch out and draw back freely back and forth, and a compressible spring is provided in each pushing rod, the pushing rods in the same direction can either share one fender plate, or each of the pushing rods is independently provided with one fender plate;

If a single-shaft single-wheel way is adopted, then a single connecting rod shaft is provided in one single wheel, and is connected with one group of connecting rods and pushing rods, each of the pushing rods is fixed to a predetermined position by more than two brackets for the pushing rods respectively, and can stretch out and draw back freely back and forth, and a compressible spring is provided in each pushing rod.

The anti-impact force apparatus, wherein the base is provided with one or more objects which can do a circular rotation movement so as to facilitate the connecting rod to drive the rotation action.

The anti-impact force apparatus, wherein, one end of the connecting rod is connected to the connecting rod journals of the objects that can do the circular motion; and the other end of the connecting rod is connected to the pushing rod, and thus the pushing rod is facilitated to drive the rotation action of the connecting rod to the objects that can do the circular motion.

The anti-impact force apparatus, wherein he pushing rod is provided with a compressible spring so as to facilitate an cushion action and a resilience action when the pushing rod is pushing forward.

The anti-impact force apparatus, wherein, the bracket for the pushing rod is provided for aligning and fixing the pushing rod to a predetermined position, and for linearly stretching out and drawing back.

The anti-impact force apparatus, wherein, the fender plate is provided with more than one pushing rod, or is simultaneously connected to a plurality of groups of pushing rods of the anti-impact force apparatus, so as to disperse force points of the impact force, and to drive all the pushing rods synchronously, and thus to implement a recoil action in a large area.

In comparison with the prior art, the above-mentioned technical solution of the present invention has the advantage that:

When the front of the fender plate is hit anywhere, four groups of pushing rods are actuated simultaneously, which can effectively disperse the impacted area.

When the fender plate is hit in front, the linear impact force will press the spring as a cushion by four groups of pushing rods, and will push the rotation of the crankshaft by means of the connecting rods, and will convert the original linear impact force to a circular movement force. When the crankshaft is rotated to a circumferential center and is aligned linearly with the pushing rod, and the connecting rod into a horizontal straight line, a conversion point of transforming an impact force into an anti-impact force occurs, the inertial force of the circular motion of the crankshaft and a relative swinging force of the crankshaft counterweight can push the connecting rods toward and over the conversion line of transforming an impact force into an anti-impact force, and the impact force is instantly transformed into an anti-impact force. With the assistance of the four groups of springs, the anti-impact force will pull instantly the pushing rod back to the impact force point, and push away an impactor with the anti-impact force which is equal to the impact force, offsetting or diminishing the devastating damage caused by the impact.

The impact force is equal to the anti-impact force, when moving objects are subjected to an impact force; when the speed of the impact force is rapid, the speed of the anti-impact force is also rapid; when the volume of the impact force is large, the volume of the anti-impact force is also large; the anti-impact force apparatus of the present invention, is completely not limited by the quality and the speed of the impactor. Can ensure the protected object, avoid suffering serious damage and casualties.

DESCRIPTION OF SIGNS o conversion point of transforming an impact force into an anti-impact force; F+ impact; F− anti-impact force; crankshaft 1; 2 connecting rod; 2-1 connecting rod; 2-2 connecting rod; 2-3 connecting rod; 2-4 connecting rod; 3 bearing; 3-1 bearing; 3-2 bearing; 4 fender plate; 4-1 fender plate; 4-2 fender plate; 5 pushing rod; 5-1 pushing rod; 5-2 pushing rod; 5-3 pushing rod; 5-4 pushing rod; 6 spring; 6-1 spring; 6-2 spring; 6-3 spring; 6-4 spring; 7 base; 8 bracket for the pushing rod; 8-1 bracket for the pushing rod; 8-2 bracket for the pushing rod; 8-3 bracket for the pushing rod; 8-4 bracket for the pushing rod; 8-5 bracket for the pushing rod; 8-6 bracket for the pushing rod; 8-7 bracket for the pushing rod; 8-8 bracket for the pushing rod; 9 connecting rod journal; 9-1 connecting rod journal; 9-2 connecting rod journal; 9-3 connecting rod journal; 9-4 connecting rod journal; 10 wheel shaft; 11 crankshaft counterweight; 12 fixing holder; 12-1 fixing holder; 12-2 fixing holder; 13 wheel; 13-1 wheel; 13-2 wheel.

DETAILED DESCRIPTION OF EMBODIMENTS

In the apparatus of the embodiment of the present invention, depending on the protection of objects of different sizes, or use a different object that can do a circular motion, but there are three embodiments.

Figure 1:
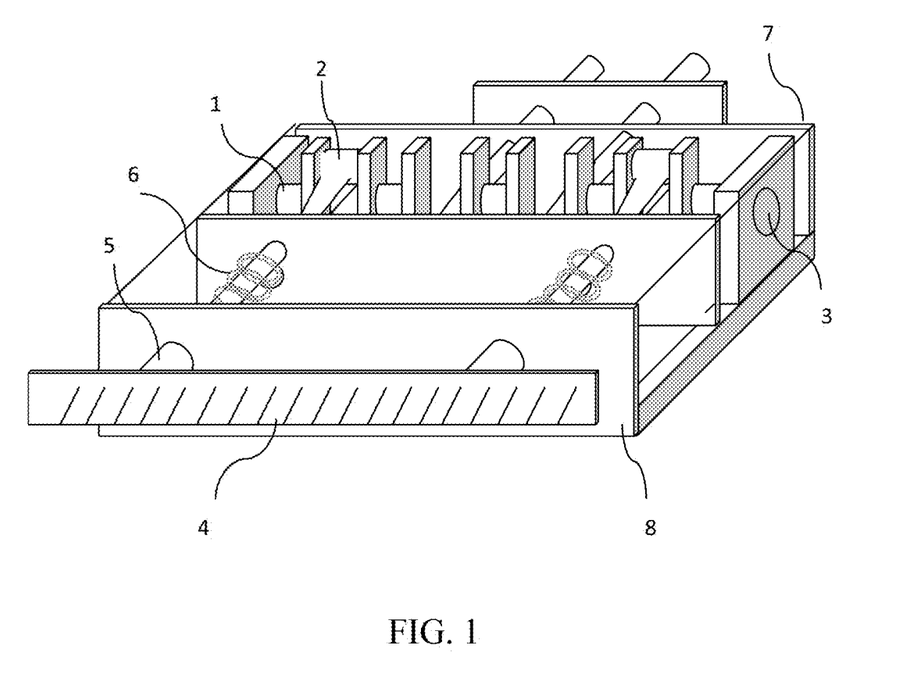
FIG. 1 is a perspective diagram of a major apparatus in the embodiment of the present invention.
Figure 2:
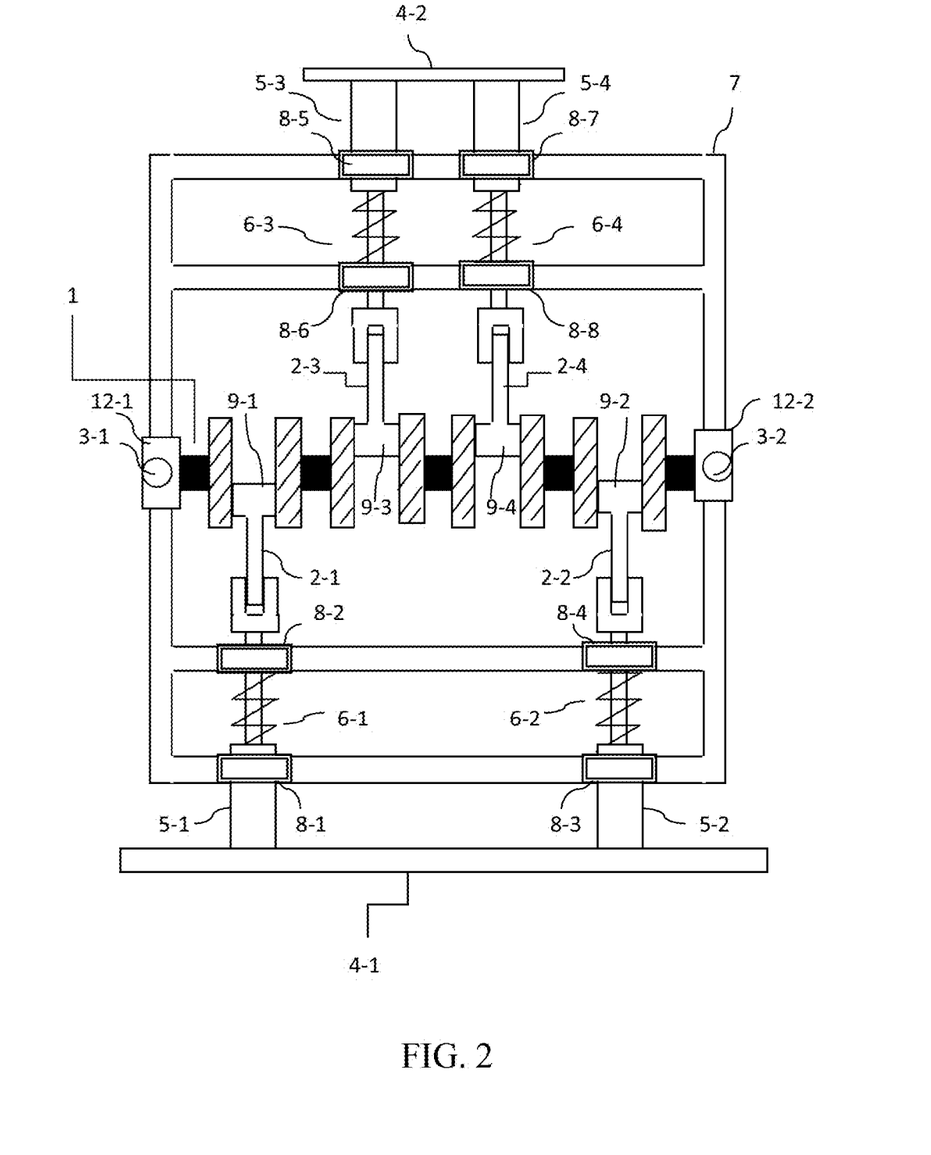
FIG. 2 is a schematic diagram of a two-direction fender device in the embodiment of the present invention.
Figure 3:
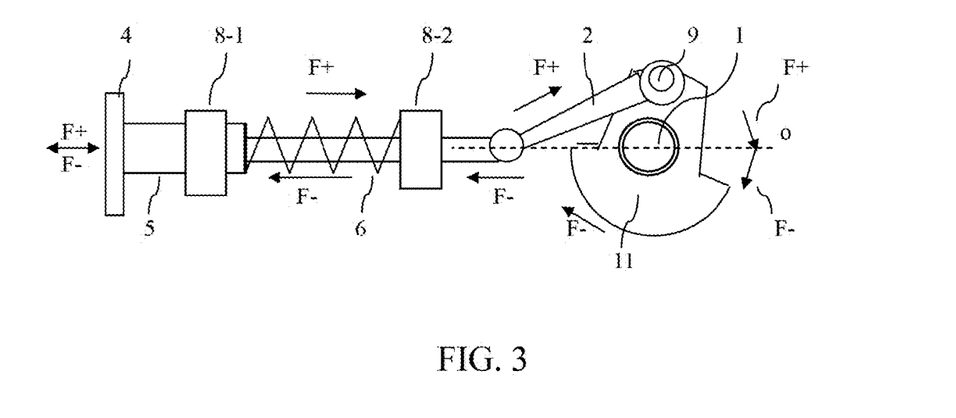
FIG. 3 is a schematic embodiment of transforming an impact force into an anti-impact force according to the invention.
Figure 6:
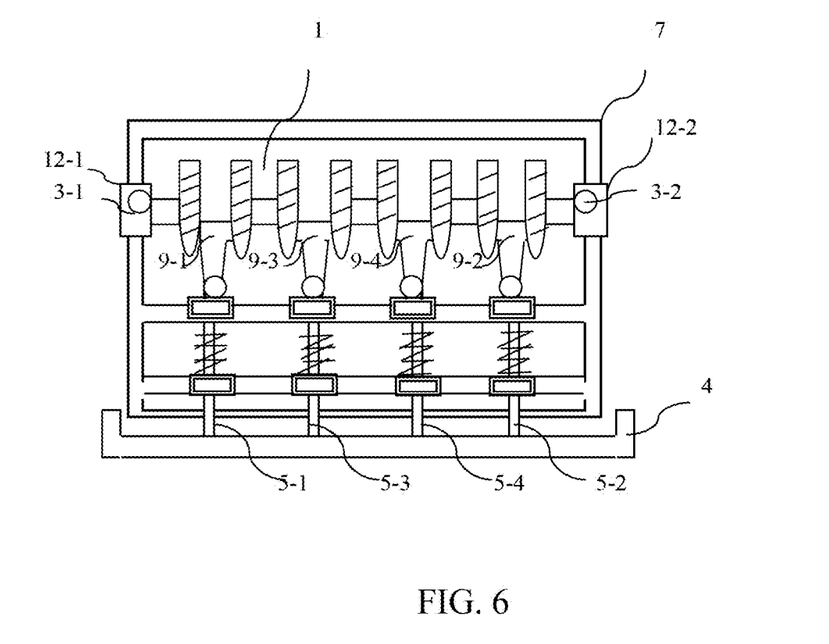
FIG. 6 is planar schematic diagram of one-direction fender device of the present invention, when the connecting rod journals of crankshaft are in the same direction.

First Embodiment: In FIG. 1, FIG. 2, in the embodiment shown in FIG. 3, the use of multi-shaft linkage means, the present invention is a device formed from a combination of the crankshaft 1, connecting rod 2, a bearing 3, fender plate 4, the pushing rod 5 spring 6, the base 7, the pushing rod holder 8. The crankshaft 1 is provided in the fixing holder 12 of the base 7, the bearing 3-1 and bearing 3-2 are provided in the two ends of the crankshaft and on the fixing holders 12-1, 12-2 respectively; one end of the connecting rod 2-1 is connected with the connecting rod journal 9-1, the other end is connected with the pushing rod 5-1; one end of the connecting rod 2-2 is connected with the connecting rod journal 9-2, the other end is connected with the pushing rod 5-2; one end of the connecting rod 2-3 is connected with the connecting rod journal 9-3, the other end is connected with the pushing rod 5-3; and one end of the connecting rod 2-4 is connected with the connecting rod journal 9-4, the other end of connecting rods with the pushing rod 5-4; brackets 8-1, 8-2, 8-3, 8-4, 8-5, 8-6, 8-7, 8-8 for the pushing rods are provided on the base 7, each bracket 8 for the pushing rod is provided with a circular hole, so as to push the pushing rod 5 to be aligned, positioned and stretched out and drew back. The center point of the circular hole is aligned with the center of the rotating circle of the crankshaft 1 into a horizontal straight line. The pushing rod 5-1 is passed through the circular holes in the brackets 8-1, 8-2 for the pushing rods. A spring 6-1 is provided on the pushing rod 5-1 and between the two brackets 8-1, 8-2 for the pushing rods. The pushing rod 5-2 is passed through the circular holes in the brackets 8-3, 8-4 for the pushing rods. A spring 6-2 is provided in pushing rod 5-2 and between the two brackets 8-3, 8-4 for the pushing rods. The pushing rod 5-3 is passed through the circular holes in the brackets 8-5, 8-6 for the pushing rods. A spring 6-3 is provided on the pushing rod 5-3 and between the two brackets 8-5, 8-6 for the pushing rods. The pushing rod 5-4 is passed through the circular holes in the brackets 8-7, 8-8 for the pushing rods. A spring 6-4 is provided in pushing rod 5-4 and between the two brackets 8-7, 8-8 for the pushing rods. As seen in FIG. 2, the outer ends of pushing rods 5-1 & 5-2 are extending in front of the base 7, and are connected with a fender plate 4-1 for fixing. The outer ends of pushing rods 5-3 & 5-4 are extending behind the base 7, and are connected with a fender plate 4-2 for fixing. Therefore, a two-direction (back and forth) protective effect can be formed. In addition, when the connecting rod journals 9-1, 9-2, 9-3, 9-4 of the crankshaft 1 are designed in the same direction, as seen in FIG. 6, the out ends of the pushing rods 5-1, 5-2, 5-3, 5-4, which extend in front of the base 7, are connected and fixed with the fender plate 4, so as to achieve a one-direction protective effect.

When a large moving object is installed in the present invention, as shown in FIG. 2, if the fender plate 4-1, which is extended in front of the base 7, is impacted in any position in the front by an external force or by itself, a strong impact force F+ will be fully introduced into by the pushing rod 5-1 and the pushing rod 5-2. Firstly, the springs 6-1, 6-2 are squeezed and buffered. Then, via the connecting rods 2-1 and 2-2, the linear impact force F+ is introduced, and the crankshaft 1 is pushed so as to form a circular motion force. When the crankshaft 1 is forced to rotate, the crankshaft 1 synchronously drives the pushing rods 5-3, 5-4, and presses the springs 6-3, 6-4, therefore, when the connecting rods 2-1, 2-2 take the impact force F+ to push and promote a circular rotation so that the pushing rods 5-1 and 5-2, the connecting rods 2-1, 2-2 and the center of rotation circle of the crankshaft 1 are aligned with each other into a horizontal straight line, that is, a conversion point o of transforming the impact force F+ into the anti-impact force F− occurs. A strong impact force F+ plus an inertia force of a circular motion of the crankshaft 1 as well as a relatively swinging force of the crankshaft counterweight 11 can quickly exceed the conversion point o of transforming an impact force F+ into an anti-impact force F−. With the assistance of rebounding of the compressed springs 6-1, 6-2 , 6-3, 6-4, the anti-impact force F− will pull instantly the pushing rods 5-1 and 5-2 back to the original impact force point, offsetting or diminishing the devastating damage caused by the impact force F+.

If the protected object is impacted in a position behind the object, a fender plate 4-2, which is extended behind the base 7, is impacted in any position in the front by an external force, a strong impact force F+ will be fully introduced into by the pushing rod 5-3 and the pushing rod 5-4. Firstly, the springs 6-3, 6-4 are squeezed and buffered. Then, via the connecting rods 2-3 and 2-4, the linear impact force F+ is introduced, and the crankshaft 1 is pushed so as to form a circular motion force. When the crankshaft 1 is forced to rotate, the crankshaft 1 synchronously drives the pushing rods 5-1, 5-2, and presses the springs 6-1, 6-2, therefore, when the connecting rods 2-3, 2-4 take the impact force F+ to push and promote a circular rotation so that the pushing rods 5-3 and 5-4, the connecting rods 2-3, 2-4 and the center of rotation circle of the crankshaft 1 are aligned with each other into a horizontal straight line, that is, a conversion point o of transforming the impact force F+ into the anti-impact force F− occurs. A strong impact force F+ plus an inertia force of a circular motion of the crankshaft 1 as well as a relatively swinging force of the crankshaft counterweight 11 can quickly exceed the conversion point o of transforming an impact force F+ into an anti-impact force F−. With the assistance of rebounding of the compressed springs 6-1, 6-2, 6-3, 6-4, the anti-impact force F− will pull instantly the pushing rods 5-3 and 5-4 back to the original impact force point, offsetting or diminishing the devastating damage caused by the impact force F+.

Figure 4:
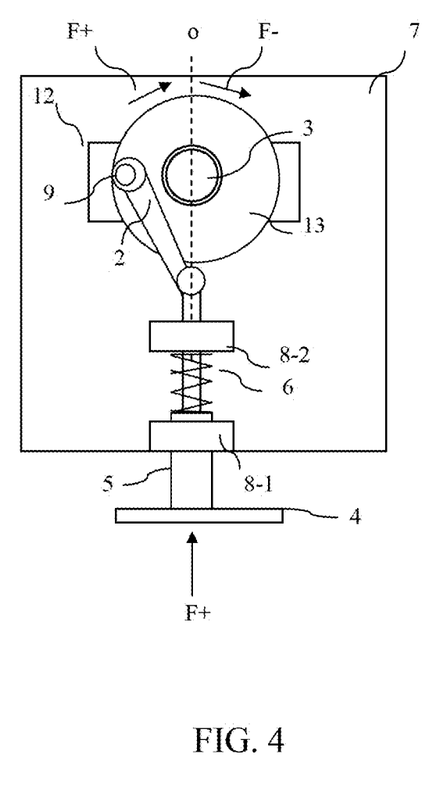
FIG. 4 is a planar schematic diagram of combing the major devices of the second embodiment of the present invention.

Second Embodiment: In the embodiment shown in FIG. 4, due to the smaller area of the protected object, a single-shaft single-wheel apparatus is adopted. A fixing holder 12 and a fixing wheel shaft 10 are provided in the base 7. The fixing wheel shaft 10 is provided with a wheel 13 with a bearing 3. A connecting rod journal 9 is provided on the wheel 13, and the wheel 13 is connected to the connecting rod 2. The other end of connecting rod 2 is connected to the pushing rod 5. Two brackets 8-1, 8-2 for pushing rods are provided on the base 7. Each bracket has a circular hole with the same height. In addition, the pushing rod 5 is passed through the circular holes in the two brackets 8-1, 8-2 for the pushing rods. The pushing rod 5 is aligned with the center of the rotating circle of the wheel 13 into a horizontal straight line. Meanwhile, a spring 6 is provided on the pushing rod 5 and between the two brackets 8-1, 8-2 for the pushing rods. The pushing rod 5 is connected with the fender plate 4 for fixing. When an impactor impacts the fender plate 4, the impact force F+ drives the pushing rod 5 to extrude and press the buffer spring 6. The pushing rod 5 introduces the impact force F+ of the original linear motion, and pushes the wheel 13 to implement a circular motion via the connecting rod 2. When the connecting rod 2, the pushing rod 5 and the center of the wheel 13 are aligned into a horizontal straight line, that is, the conversion point o of transforming the impact force F+ into the anti-impact force F− occurs, the rotational inertia of the wheel 13 and the swinging force of the crankshaft counterweight 11 instantly push the connecting rod 2 toward and over the conversion point o. With the assistance of rebounding by the springs squeezed at the same time, the anti-impact force F− will pull instantly the pushing rod 5 back to the impact force point, offsetting or diminishing the devastating damage caused by the impact force F+.

Figure 5:
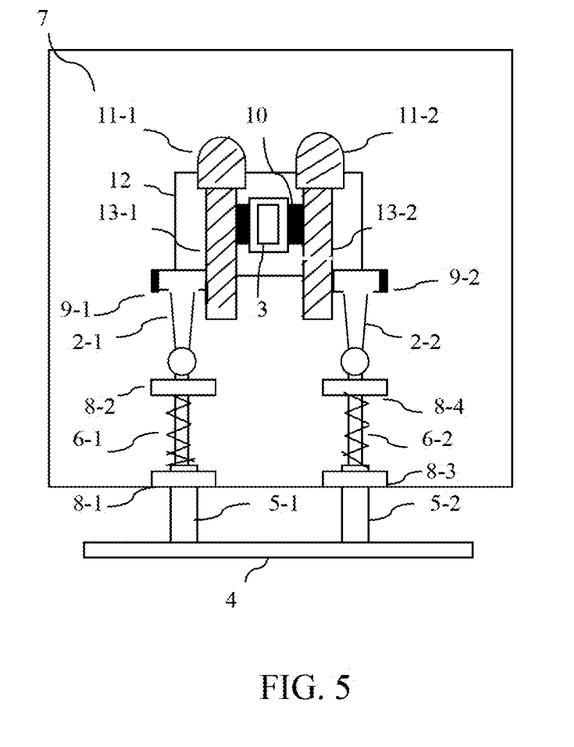
FIG. 5 is a planar schematic diagram of combing the major devices of the third embodiment of the present invention.

Third Embodiment: In the embodiment shown in FIG. 5, a single-shaft two-wheel apparatus is adopted. A fixing holder 12 is provided on the base 7. A wheel shaft 10 is also provided. A bearing 8 is provided in the middle of the transverse wheel shaft, so that rotation of the wheel shaft 10 can rotate smoothly. The fixing wheel 13-1 and the wheel 13-2 are provided in two ends of the wheel shaft 10. Because the two wheels share a common wheel shaft, when one wheel 13-1 rotates, the other wheel 13-2 will also rotate. A connecting rod shaft 9-1 and a connecting rod shaft 9-2 are provided at the same location of the wheel 13-1 and the wheel 13-2. One end of the connecting rod 2-1 is connected with the connecting rod journal 9-1, the other end is connected with the pushing rod 5-1; one end of the connecting rod 2-2 is connected with the connecting rod journal 9-2, the other end is connected with the pushing rod 5-2. Four brackets 8-1, 8-2, 8-3, 8-4 for the pushing rods are provided on the base 7, each bracket for the pushing rods is provided with a circular hole having the same height with the center of the wheel. The pushing rod 5-1 is passed through the circular holes in the brackets 8-1, 8-2 for the pushing rods. The pushing rod 5-2 is passed through the circular holes in the brackets 8-3, 8-4 for the pushing rods. The pushing rod 5-1 is aligned with the center of the wheel 13-1 into a horizontal straight line. The pushing rod 5-2 is aligned with the center of the wheel 13-2 into a horizontal straight line. At the same time, a spring 6-1 is provided on the pushing rod 5-1 and between the two brackets 8-1, 8-2 for the pushing rods, and a spring 6-2 is provided in pushing rod 5-2 and between the two brackets 8-3, 8-4 for the pushing rods. The pushing rods 5-2 and 5-1 are connected with the fender plate 4 for fixing. When the fender plate 4 is impacted by an impactor, the impact Force F+ instantly drives the pushing rods 5-1 and, 5-2 to squeeze the spring 6-1 and the spring 6-2. Because the wheels 13-1 and 13-2 share a shaft or an axis, via connecting rods 2-1 and 2-2, the pushing rods 5-1 and 5-2 synchronously taking the original linear impact force F+ to push the wheels 13-1 & 13-2 into a circular rotation motion. When the connecting rods 2-1 and 2-2, the pushing rods 5-1 and 5-2, and the centers of the wheels 13-1 and 13-2 are aligned with each other into a horizontal straight line, the conversion point o of transforming the impact force F+ into the anti-impact force F− occurs, the rotational inertia of the impacted wheel 13 and the swinging force of the crankshaft counterweight 11 instantly push the connecting rods 2-1 and 2-2 toward and over the conversion point o, and the impact force F+ is instantly transformed into an anti-impact force F−. With the assistance of rebounding by the springs 6-01 and 6-2 squeezed at the same time, the anti-impact force F− will pull instantly the pushing rods 5-1 and 5-2 back to the impact point, offsetting or diminishing the devastating damage caused by the impact force F+.

The present invention is an anti-impact force apparatus designed to avoid a damage caused by a tremendous impact to objects and people, when a protected object is impacted, wherein: the fender plate of the object is impacted, the impact force can be dispersed to a plurality of groups pushing rods while providing dynamic buffer at the same time. In addition, the impact force of the original linear motion is introduced, a circular motion is pushed by the crankshaft via the connecting rod, and then the impact force is transformed into an anti-impact force which is equal to the impact force by means of the circular rotation movement of the crankshaft, and the impact of forces is instantly reduced, so as to offset or weaken the damage caused by the big impact force.

For the present invention described above are merely illustrative, and not restrictive, it will be appreciated by those skilled in the art, any modification, variation, or equivalence without departing from the spirit and scope as defined in the claims, will fall within the protection scope of the present invention.

The invention claimed is:
1. An anti-impact force apparatus, comprising:
    a counterweight in the form of a crankshaft, connecting rods, pushing rods, a fender plate, compression springs, a bearing, a bracket for each of the pushing rods, and a base;
    wherein the crankshaft is mounted on the base by a bearing so as to rotate freely;

the crankshaft has multiple connecting rod journals, one end of each connecting rod is connected to one of the connecting rod journals of the crankshaft, and an opposite end of each connecting rod is connected to one of the pushing rods, each of the pushing rods passes through holes defined in each of the brackets for the pushing rods and moves back and forth, and each of the compressible springs is provided on each of the pushing rods, each of the pushing rods connected with the fender plate, wherein the pushing rods push the crankshaft which in turn rotates the crankshaft.

* * * * *